US010343937B2

(12) United States Patent
Casbeer et al.

(10) Patent No.: US 10,343,937 B2
(45) Date of Patent: Jul. 9, 2019

(54) ELECTROCOAGULATION REACTOR

(71) Applicant: De Nora Water Technologies, LLC, Sugar Land, TX (US)

(72) Inventors: Dana Casbeer, Angleton, TX (US); Larry Knight, Sugar Land, TX (US); Rudolf Matousek, Richmond, TX (US); Rubin Bariya, Houston, TX (US)

(73) Assignee: De Nora Water Technologies, LLC, Sugar Land, TX (US)

( * ) Notice: Subject to any disclaimer, the term of this patent is extended or adjusted under 35 U.S.C. 154(b) by 583 days.

(21) Appl. No.: 14/870,966

(22) Filed: Sep. 30, 2015

(65) Prior Publication Data

US 2016/0101996 A1   Apr. 14, 2016

Related U.S. Application Data

(60) Provisional application No. 62/061,982, filed on Oct. 9, 2014.

(51) Int. Cl.
*C02F 1/463* (2006.01)
*C02F 1/461* (2006.01)
*C02F 103/08* (2006.01)

(52) U.S. Cl.
CPC .......... *C02F 1/463* (2013.01); *C02F 1/46109* (2013.01); *C02F 2001/46119* (2013.01); *C02F 2001/46128* (2013.01); *C02F 2103/08* (2013.01); *C02F 2201/461* (2013.01); *C02F 2301/028* (2013.01)

(58) Field of Classification Search
CPC ..................................................... C02F 1/463
See application file for complete search history.

(56) References Cited

U.S. PATENT DOCUMENTS

| 3,669,869 A | 6/1972 | Burton |
| 4,799,394 A * | 1/1989 | Barnett ............... G01N 1/24 73/863.01 |
| D304,610 S | 11/1989 | Conaway |

(Continued)

FOREIGN PATENT DOCUMENTS

| EP | 0794157 A1 | 9/1997 |
| FR | 2707282 A1 | 1/1995 |

(Continued)

OTHER PUBLICATIONS

IPOS Search Report and Written Opinion dated Apr. 26, 2018 for co-pending Singaporean patent app. No. 11201702579Y.

(Continued)

*Primary Examiner* — Salil Jain
(74) *Attorney, Agent, or Firm* — D'Ambrosio & Menon, PLLC; Usha Menon

(57) ABSTRACT

An electrocoagulation reactor (ECR) apparatus and methods of using the ECR apparatus in the treatment of a fluid stream. The ECR apparatus includes a noncorrosive cylindrical cell housing a plurality of horizontally stacked electrode plates. The electrode plates are held in a pair of grooved, crescent shaped non-conductive inserts. The ECR apparatus further includes two end flanges each having integral flow diverters to facilitate a continuous single serpentine flow of the fluid in the cell. The ECR apparatus further includes a single flow inlet and single flow outlet.

15 Claims, 8 Drawing Sheets

(56) References Cited

U.S. PATENT DOCUMENTS

| | | | |
|---|---|---|---|
| 4,917,782 A * | 4/1990 | Davies | B01D 17/06 |
| | | | 204/228.3 |
| 5,094,739 A | 3/1992 | Kump | |
| 5,753,100 A | 5/1998 | Lumsden | |
| 6,238,546 B1 | 5/2001 | Knieper et al. | |
| 6,270,650 B1 | 8/2001 | Kazi | |
| 6,346,197 B1 * | 2/2002 | Stephenson | C02F 1/463 |
| | | | 204/242 |
| 6,350,385 B1 | 2/2002 | Holt | |
| D554,735 S | 11/2007 | Orritt | |
| 8,147,661 B2 | 4/2012 | Moon | |
| D756,484 S | 5/2016 | Johnson | |
| D764,017 S | 8/2016 | McMahon et al. | |
| 9,403,699 B2 | 8/2016 | Matsuyama | |
| 2002/0040855 A1 | 4/2002 | Morovsky et al. | |
| 2003/0183516 A1 | 10/2003 | Klose | |
| 2004/0099607 A1 | 5/2004 | Leffler et al. | |
| 2011/0155564 A1 * | 6/2011 | Oifman | B01D 21/0003 |
| | | | 204/230.2 |
| 2011/0308938 A1 * | 12/2011 | Gilmore | C02F 1/46109 |
| | | | 204/228.6 |
| 2012/0068167 A1 | 3/2012 | Sako et al. | |
| 2012/0103797 A1 * | 5/2012 | Hermann | C25B 9/00 |
| | | | 204/278.5 |
| 2014/0311960 A1 * | 10/2014 | Xia | C02F 1/463 |
| | | | 210/202 |
| 2014/0353168 A1 * | 12/2014 | Benedetto | C02F 1/46109 |
| | | | 205/751 |
| 2016/0090314 A1 * | 3/2016 | Dale | C02F 1/44 |
| | | | 205/751 |
| 2017/0022075 A1 * | 1/2017 | Ritchie | C02F 1/46104 |

FOREIGN PATENT DOCUMENTS

| | | |
|---|---|---|
| WO | 9943617 A1 | 9/1999 |
| WO | 2004089832 A1 | 10/2004 |
| WO | 2008144099 A1 | 11/2008 |
| WO | 2011000079 A1 | 1/2011 |
| WO | 2011159941 A1 | 12/2011 |

OTHER PUBLICATIONS

EPO Extended Supplemental Search Report dated Mar. 14, 2018 for co-pending European patent app. No. 15849564.8.
WIPO Search Report and Written Opinion dated Dec. 17, 2015 for related co-pending PCT app. No. PCT/US15/53162.
USPTO Ex-Parte Quayle Action dated Mar. 21, 2017 for co-pending and related U.S. Appl. No. 29/541,107.
Office Action dated Sep. 13, 2018 for co-pending counterpart Chilean patent app. No. 800-2017.
Office Action dated Sep. 14, 2018 for co-pending counterpart Chilean patent app. No. 800-2017.

* cited by examiner

ELECTROCOAGULATION REACTOR

RELATED APPLICATION

This application claims the benefit of priority of U.S. Provisional Patent Application No. 62/061,982 filed Oct. 9, 2014 which is incorporated herein by reference in its entirety.

BACKGROUND OF THE INVENTION

The present disclosure relates generally to the treatment of water, and, more particularly, to an electrocoagulation apparatus for the treatment of industrial and offshore marine wastewaters.

Electrocoagulation can be used in the treatment of wastewater. Electrocoagulation involves the use of electric current to remove contaminants from wastewater. The term "wastewater," as used herein, includes any water stream from which one may wish to remove a contaminant even though the contaminant may not necessarily be harmful to health. The contaminant may include heavy metals, bacteria, Biochemical oxygen demand (BOD), Chemical oxygen demand (COD), Total dissolved solids (TDS), Total suspended solids (TSS), virus, pesticides, arsenic, MTBE and cyanide. The contaminants may be suspended in the water by electrical charges. Since electrocoagulation does not involve the use of chemical or biological additives, it is an environmentally safe treatment process.

BRIEF DESCRIPTION OF THE DRAWINGS

The various aspects, features, and advantages of certain exemplary embodiments of the present invention will be more apparent from the following description taken in conjunction with the accompanying drawings, in which.

DETAILED DESCRIPTION

Figure 1A:
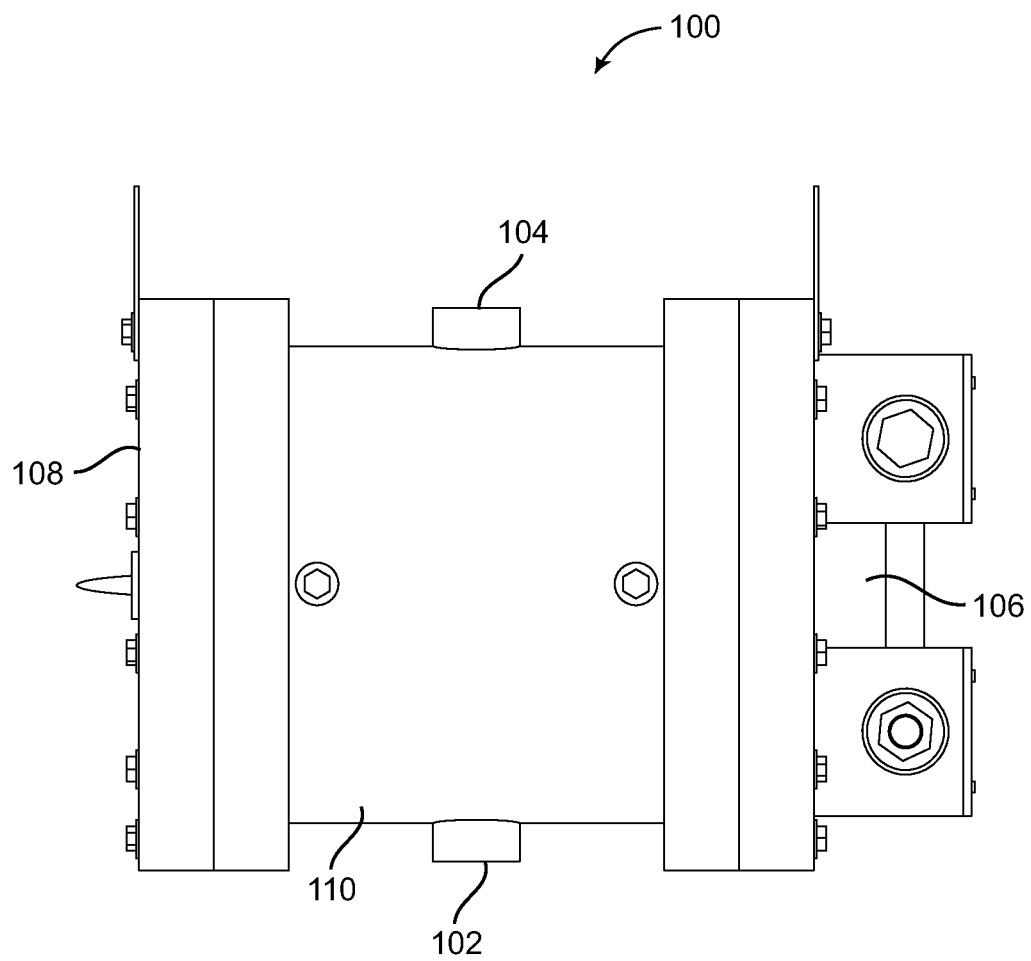
FIGS. 1A and 1B depict two views of an electrocoagulation reactor apparatus according to an embodiment of the invention.

Wastewater treatment involves the passage of a contaminated wastewater stream through an electrocoagulation (EC) device. Conventional EC devices include an electrolytic cell with one or more pairs of conductive metal plates arranged in a vertical stacked configuration. Each such pair includes a plate which acts as a cathode and another plate which acts as an anode electrode. The electrodes are submerged in the water to be treated. The anode may be obtained as iron, steel, stainless steel, aluminum, titanium, titanium alloy or other valve metal substrate.

When electric current is applied to the electrolytic cell, the anode material will begin to electrochemically dissolve/erode due to oxidation at the anode surface, while the cathode surface will be subjected to passivation and will not dissolve. The dissolving anode is called the "sacrificial electrode." The sacrificial electrode continuously releases (iron) ions in the water. The released ions destabilize the charges of the suspended contaminants in the wastewater stream. This initiates a coagulation process by producing aggregates or flocculent particles that are nucleation sites for the contaminants that then drop out of solution. These flocculent particles or flocs are managed either by flotation or gravitational settling in a chamber or in a bath of an electrolyte.

Conventional EC devices include a tank having a number of metallic electrode plates or electrodes arranged in a vertical stacked configuration wherein the electrodes may be arranged parallel to each other. It is important to periodically substitute the electrodes. For example, in the case of electrodes made of a conductive non-catalytic substrate provided with an electrocatalytic coating, the coating may be subject to deactivation with time, due to consumption, detachment from the substrate, passivation of the substrate itself in the area contacting the electrocatalytic coating, or for other reasons. Conventional EC devices are quite large and rely on dissolved air flotation techniques that require extensive maintenance. They also require solids offloading/handling logistics that typical offshore oil and gas platform operators are not willing to manage. Consequently, EC technology has not been widely adopted on offshore oil and gas platforms for wastewater treatment.

Accordingly, there is a need for an EC apparatus that is durable and requires minimal maintenance over its life. It should be capable of being implemented in a relatively small floor surface area such that it can be used onboard small marine vessels. It should be easily and efficiently manufactured and fabricated from readily available components. It should be cost efficient and safe for an offshore operator to perform routine maintenance.

Aspects of the present invention address at least the above-mentioned problems and/or disadvantages and to provide at least the advantages described below. Accordingly, an aspect of the present invention provides a method and an electrocoagulation reactor (ECR) apparatus for the treatment of a fluid stream.

According to an embodiment, an ECR apparatus for the treatment of a fluid stream is provided. The fluid stream may include a wastewater stream or any other liquid stream, such as, a heavy metal liquid stream. The ECR apparatus includes: (A) a cylindrical cell; and (B) an electrode packing frame. The cell comprises a cylindrical or drum-shaped chamber or body for receiving the electrode packing frame. The electrode packing frame may include: (i) a pair of opposing inserts, wherein each of the inserts comprises a plurality of insert openings; and (ii) an electrode stack comprising a plurality of electrode plates. Each of the electrode plates is horizontally stacked within a pair of opposing insert openings formed on the pair of opposing inserts. The electrode packing frame is inserted within the cell body.

The outer sidewall of each of the inserts is curved. The insert openings can be defined or formed on an inner sidewall of each of the inserts. Each electrode plate or electrode can be positioned at a predetermined distance from an adjacent electrode. Further, each electrode can be equidistant to an adjacent electrode. Each of the inserts can be substantially half-moon or crescent-shaped. Each of the inserts is configured to be non-conductive, removable and replaceable. Each of the inserts is configured to divert the wastewater to only active areas of the plurality of electrode plates.

The outer sidewall of the inserts comprises one or more insert apertures or openings. The cell comprises cylindrical sidewalls, wherein the cylindrical sidewalls of the cell further comprises one or more openings. Each opening on the outer sidewall of the inserts is aligned with a corresponding opening on the cylindrical sidewalls of the cell to form a throughhole when the electrode packing frame is inserted within the cell. The ECR apparatus can include a locking device. The locking device can be threaded into the throughhole to securely couple the electrode packing frame to the cell body.

The electrode plates comprise a pair of upper and lower terminal electrodes. A plurality of bipolar electrode plates are stacked intermediate to the terminal electrodes. Each electrode plate is stacked in a horizontal alignment with an adjacent electrode plate. A conducting bar can be attached to at least one or both of the terminal electrodes.

The ECR apparatus further comprises a first and a second flange. Each of the flanges is configured to seal a first and a second end of the cylindrical cell. Each of the first and the second end flanges further comprise a plurality of integral flow diverters. The flow diverters are configured to facilitate a serpentine flow of the wastewater within the cell.

According to another embodiment, a method for treating a fluid stream is disclosed. The method involves: combining a pressurized saline seawater stream with the fluid stream to form a process stream; passing the process stream through the ECR apparatus described herein to facilitate the formation of a flocculated precipitate by subjecting the process stream to electrolysis using the electrodes, wherein the flocculated precipitate comprises suspended solid contaminants. In another aspect, the method involves passing a fluid waste stream through the ECR apparatus without combining it with a pressurized saline seawater stream.

The method further involves settling the flocculated precipitate and discharging a substantially contaminant-free supernate from a settling tank operatively coupled to the ECR apparatus.

The method further involves positioning each pair of opposing insert openings at a predetermined and equal distance from an adjacent pair of opposing insert openings to facilitate an even and equal flow of the process stream between each of the electrode plates. A serpentine flow of the process stream is facilitated in the ECR apparatus.

The method further involves cleaning the electrode plates in-situ under high pressure conditions.

Figure 1B:
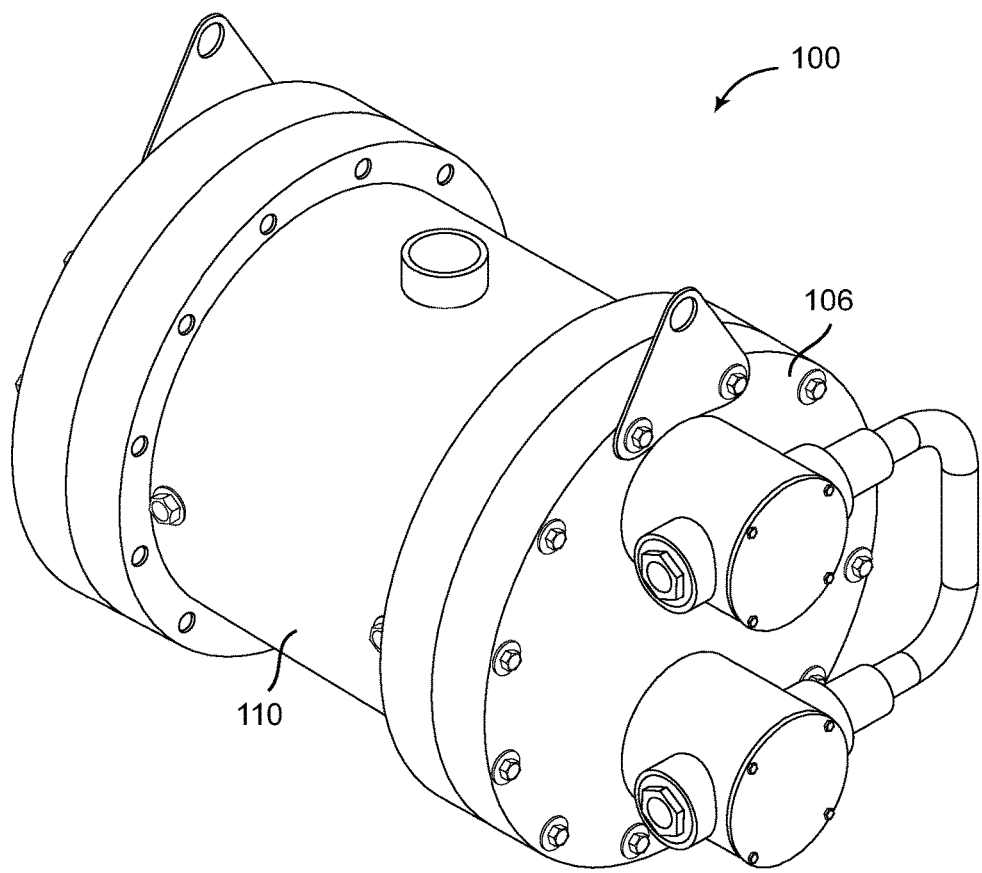

FIGS. 1A and 1B are two views of an ECR apparatus according to an exemplary embodiment. The ECR apparatus 100 can include a cylindrical or tubular cell 110. The cell 110 can be conveniently sealed with a pair of first and second removable flanges or terminal access covers 106 and 108. The cell 110 is configured to be cylindrical in shape in order to withstand higher fluid/hydrostatic pressures as opposed to conventional EC devices that have a flat body which may be susceptible to bowing under similar pressures. Conveniently, the cell 110 can be fabricated from any cylindrical or tube-shaped structure. For example, the cell 110 can be fabricated from any industry standard or commonly available components, such as, a pipe. The cell 110 includes a fluid inlet 102 and a fluid outlet 104.

The cell 110 can be made of any suitable non-corrosive and non-conductive material. The cell 110 may be manufactured from, for example, PVC, other plastics, or a coated metal. The cell 110 can have any suitable size/length/diameter.

Figure 2:
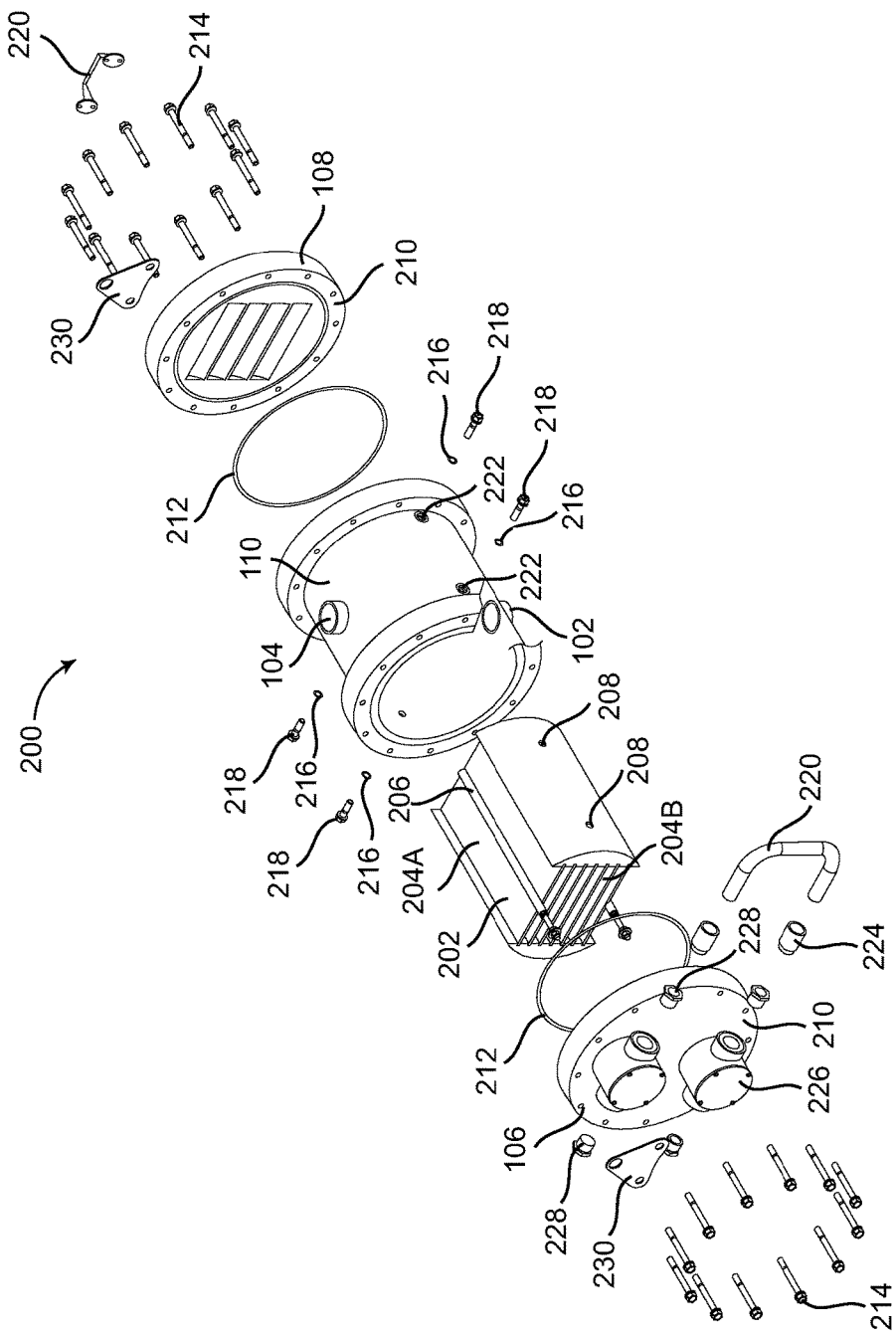
FIG. 2 is a schematic view of the components of an electrocoagulation reactor apparatus according to an embodiment of the invention.

FIG. 2 illustrates exemplary components 200 of the ECR apparatus. The components 200 can include the tubular/cylindrical cell 110 as described earlier. The cell 110 includes a fluid inlet 102 located on a lower quadrant tangential to the cell 110 and a fluid outlet 104 located at a top quadrant tangential to the cell 110. The cell 110 further includes an electrode packing frame 202 for housing a plurality of electrodes.

Figure 3:
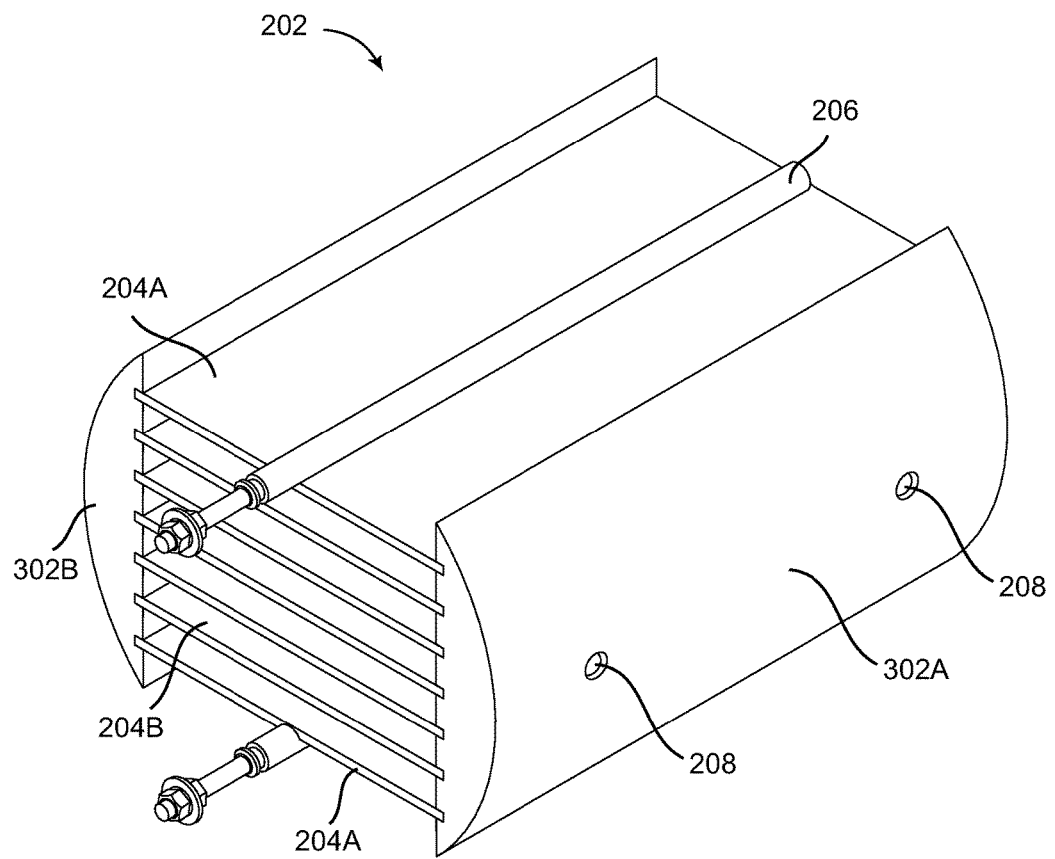
FIG. 3 is a perspective view of an electrode packing frame according to an embodiment of the invention.

Referring to FIGS. 2 and 3, the electrode packing frame 202 can include a pair of non-conductive inserts 302A and 302B. The inserts 302A, 302B may be manufactured from Polyvinyl Chloride (PVC), Chlorinated Polyvinyl Chloride (CPVC), Acrylonitrile Butadiene Styrene (ABS) or another suitable non-conductive material.

The inner sidewall of insert 302A is arranged such that it faces the inner sidewall of insert 302B. Insert 302A may be spaced apart from insert 302B at a predetermined distance. The inner sidewalls of each insert 302A, 302B may include a plurality of grooves or openings (not shown). The inserts 302A, 302B are arranged such that the insert openings on insert 302A are substantially aligned with the insert openings on insert 302B thereby forming a corresponding pair of insert openings. Each insert opening pair is spaced at a predetermined distance from an adjacent insert opening pair. The insert openings may be dimensioned to securely receive electrode plates 204A, 204B (collectively referred to as "electrodes"). The predetermined distance may be substantially equal to the width of one or more electrodes. The inserts 302A, 302B are configured to divert fluid flow to only active areas of the electrodes and can minimize non-conductive or dead areas of the electrodes. Since the inserts 302A, 302B may be worn with use and over time, they are designed to be easily and conveniently removed and replaced by an operator. This may also increase the operating life of the ECR apparatus.

Figure 7:
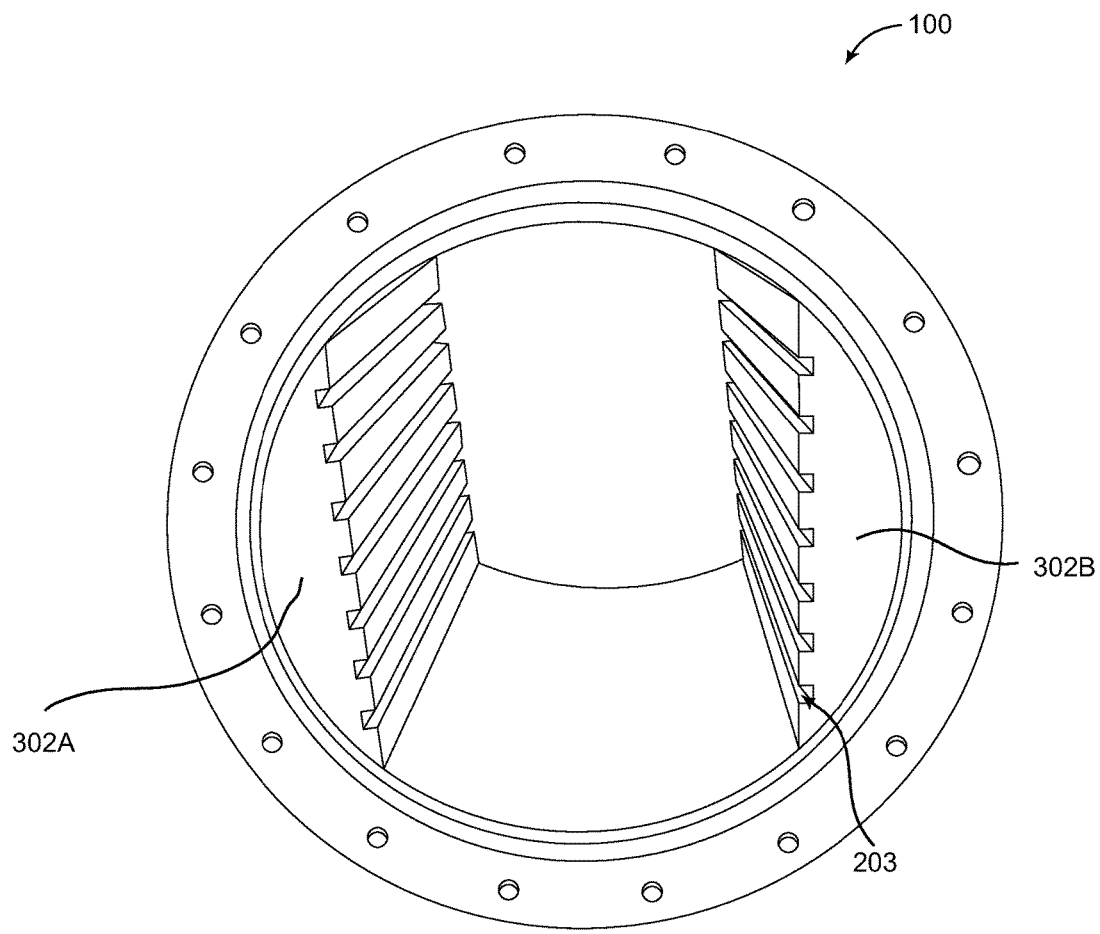
FIG. 7 is a perspective view of an electrocoagulation reactor apparatus comprising an electrode packing frame according to an embodiment of the invention.

The outer sidewalls of the inserts 302A, 302B may have a geometry that corresponds to the inner diameter of the cell 110. For example, the outer sidewalls may be curved. The inner sidewalls of the inserts 302A, 302B may be substantially flat such that the inserts 302A, 302B are substantially crescent-shaped. As shown in FIG. 7, the inserts 302A, 302B may include a plurality of grooves or openings 203 for receiving the electrodes.

The inserts 302A, 302B can be welded to the cell 110. The inserts 302A, 302B can be dimensioned such that they can be inserted within the cell 110 by the application of a suitable force. The inserts 302A, 302B may include one or more insert apertures 208 for receiving a suitable locking or fastening mechanism. The cell 110 may also include a pair of cell openings 222 on opposing sidewalls. The inserts 302A, 302B are positioned in the cell 110 such that the insert apertures 208 are aligned with the cell openings 222 on each cell sidewall to form a through hole for receiving insert fastening or locking devices 216, 218. The insert locking devices 216, 218 may include any suitable device. In one embodiment, the locking mechanism may include a hex headed bolt/washer/O-ring assembly. This arrangement facilitates the periodic replacement of the inserts 302A, 302B as they age with the passage of time.

Figure 5:
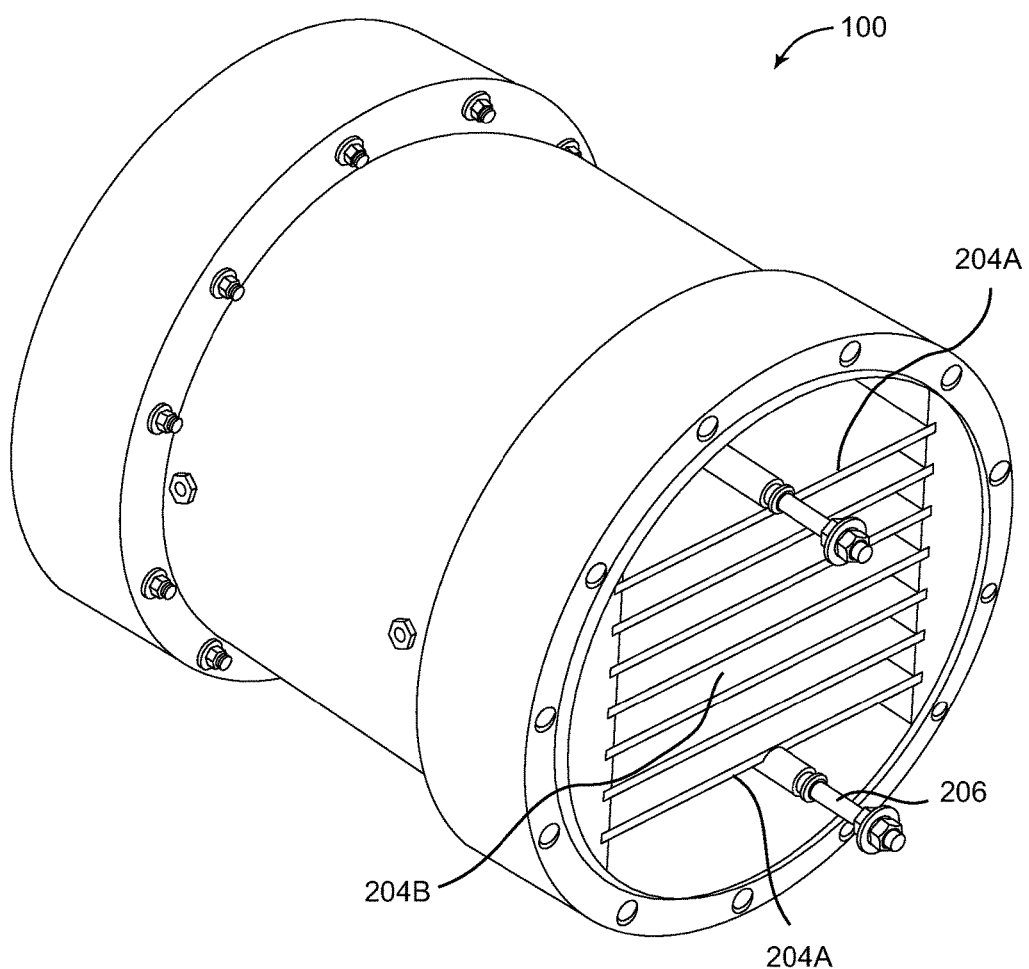
FIG. 5 and FIG. 6 are perspective views of an electrocoagulation reactor apparatus comprising an electrode packing frame having a plurality of electrode plates according to an embodiment of the invention.
Figure 6:
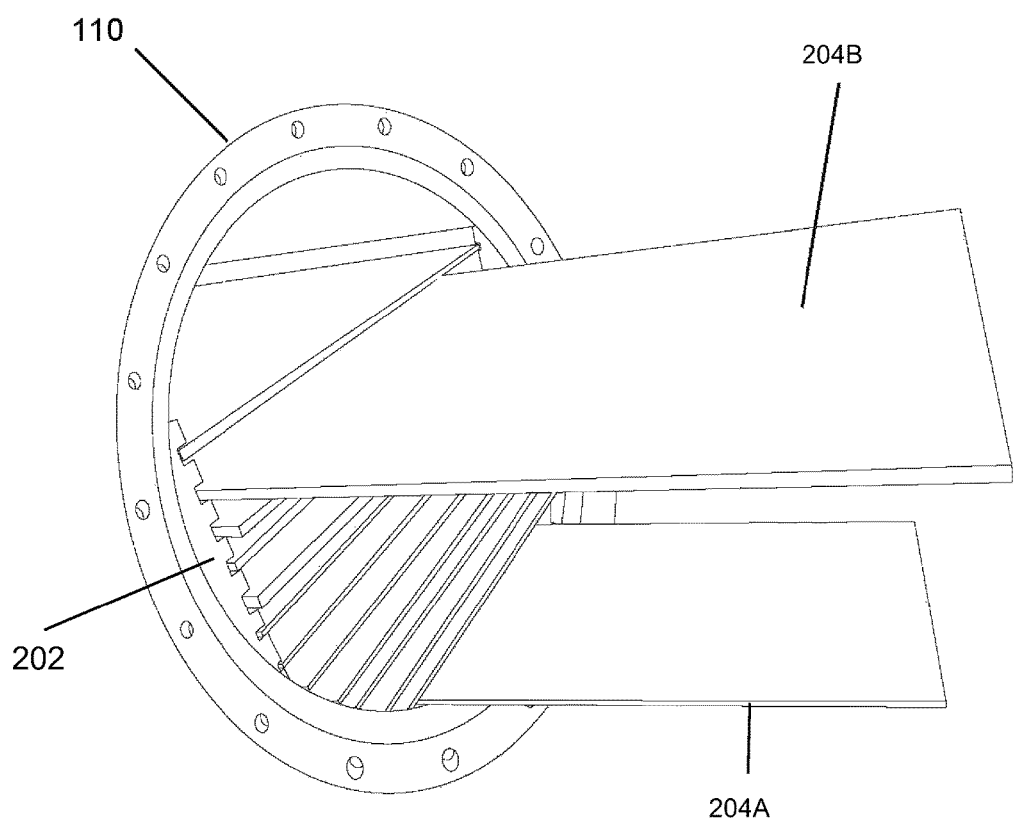

As shown in FIGS. 5 and 6, the electrode packing frame 202 may be inserted inside the cell 110. The electrode packing frame 202 includes an electrode stack having a plurality of planar bipolar metallic plates 204B and a pair of terminal electrodes 204A. The bipolar metallic plates 204B act as consumable electrodes. The electrode plates 204A, 204B can be arranged in parallel to each other. Also, the electrodes 204A, 204B can be arranged such that each electrode plate 204A, 204B can be individually removed from the cell 110. This allows the operator to conveniently replace or reactivate the electrodes 204A, 204B, as required. As shown in FIG. 5, a pair of conductor or a current distribution bars 206 can be welded onto a non-reactive surface of the upper and lower terminal electrodes 204A.

Referring back to FIG. 3, a plurality of bipolar electrode plates 204B are sandwiched between or intermediate to a pair of upper and lower terminal electrode plates 204A. The terminal electrodes 204A lie in the same plane as the intermediate electrodes 204B to define multiple contact surfaces for the fluid to be treated. The terminal electrodes 204A are configured to act only as an anode or cathode based on the stage in the fluid or wastewater treatment cycle. The intermediate electrodes 204B are, however, bipolar where one planar or flat side may be an anode and the other planar or flat side of the same electrode 204B may be a cathode. The electrical polarity of the electrodes 204B can be periodically reversed to alternate the wear pattern such that each electrode 204B wears uniformly.

The terminal electrode plates 204A may be thinner in comparison to the intermediate electrodes 204B since their rate of wear is comparatively slower. The intermediate electrodes 204B and the terminal electrodes 204A may include a substrate of iron, steel, carbon, copper, aluminum, ceramics, titanium, titanium alloy or other valve metal. The terminal electrodes 204A may be provided with a superficially applied external electrocatalytic coating containing a mixture of oxides of tin, ruthenium, iridium, palladium, niobium or other electrocatalytic materials to still carry current while reducing their rate of dissolution and extending their useful life. The extension of their useful life facilitates valuable cost savings. The electrodes 204B and terminal electrodes 204A can be arranged in a predetermined coordinated spacing between the inserts 302A, 302B.

The electrodes 204A, 204B are stacked in a horizontal arrangement. This horizontal arrangement ensures that a comparatively larger surface area of the electrodes 204A, 204B is available for consumption/utilization. This can enhance operating performance. Also, unlike with conventional EC devices, the electrodes 204A, 204B do not have to be sealed. Advantageously, almost the entire surface area, that is, about 95% or more of the surface area, of the electrodes 204A, 204B may be utilized. On the other hand, less than 70% of the electrode surface area is available for consumption in conventional plate and frame EC devices. The greater surface area utilization of the electrodes 204A, 204B can potentially translate into a reduction in the amount of steel or other material of the electrode. For example, if there is a need for 10 sq. ft. of active area (10 plates, one sq. ft. each), using the embodiments of the invention would only require 10 plates each 1.05 sq. feet or 10.50 sq. ft. total. This is contrasted with conventional EC devices that would require 10 plates each 1.43 sq. ft. or 14.30 sq. ft. at 70% utilization.

In one exemplary embodiment, fifteen electrode plates (forming 14 cells) may be placed in the electrode packing frame 202. Each plate can have an active surface area of 193.5 square inches (length=18", width=8¾", and thickness=¼") while providing design flow per cell of 3600 L/day.

A conductor or a current distribution bar 206 can be welded on an outside or the non-reactive surface of the upper and/or lower terminal electrodes 204A. The conductor bars 206 may extend across the length of the terminal electrodes 204A. This conductor bar 206 can facilitate optimum current distribution and easy connection to a power supply source (not shown). The conductor bar 206 promotes an even and uniform distribution of current through the electrodes 204A, 204B to facilitate an even consumption across the face of the terminal and intermediate electrodes 204A, 204B.

Referring back to FIG. 2, the conductor bar 206 may extend through a first end flange 106. In order to enhance safety, the terminal electrode plates 204A can be terminated in individual bus connections at a first terminal access cover. A rectifier (not shown) may be used to take alternating current from a suitable power source, rectify it, and provide direct current (DC) to the junctions. The amount of voltage and current required may depend on the volume of wastewater that is to be treated and the type and concentration of known contaminants. To obtain optimum performance and uniform wear of the electrodes 204A, 204B, the voltage from the rectifier may be periodically reversed. Advantageously, the reversing DC current polarity may be applied at the terminal electrodes 204A for promoting an even dissolution from either face of the electrodes 204B in the fluid stream for the purposes of disinfection and flocculation/agglomeration of suspended solids without the need for any additional external coagulants. Also, the reverse polarity has an in-situ cleaning effect to remove unwanted deposits and metal scale to provide a more uniform surface to conduct electrolysis. It has been observed that current densities from 0.03 to 0.20 ASI can generate adequate flocs to create good coagulation and better separation of solids and liquid.

Each terminal electrode bus connection may include a protective cover 226. The covers 226 can protect the operator from shock and protect the connection from environmental factors. A connection device 228, such as, an access plug, for making the electrical connection between the terminal electrodes and the power supply may be provided at a corner of the terminal access cover 226. The access plug 228 may include an insulated casing with metal pins that fit into holes in an outlet.

The first and second terminal access covers or end flanges 106, 108 are simple bolt on/off closures. Conveniently, the cell 110 does not require a high pressure ram to achieve a leak tight state. The bolt-on/off closure flange arrangement facilitates front-end access to the electrode stack. Furthermore, it facilitates a quick replacement of the intermediate electrodes 204B and terminal electrodes 204A. A pair of seals, such as, O-rings 212 can be used to seal the first and second end flanges 106, 108 to the cell 110. Each end flange 106, 108 can be held in place using suitable flange fastening devices 214. For example, the end flanges 106, 108 can be held in position with a number of bolts (for example, 16 bolts), flat washers, plates, lock washers and nuts. These flange fastening devices 214 can be threaded through openings 210 on the end flanges 106, 108 and can be secured by studs or posts (not shown) on the cell 110. The bolted end flanges 106, 108 simplify the assembly and the disassembly of the ECR apparatus. The end flanges 106, 108 may be provided with lifting lugs 230. The lifting lugs 230 may be provided with openings. It is understood that when the electrode packing frame 202, with the electrodes 204A, 204B, is inserted within the cell, the weight of the ECR apparatus 200 increases substantially. Therefore, to facilitate convenient handling and transportation, a suitable hook, such as, a J-hook (not shown), may be inserted into the openings of the lifting lugs 230. A chain may be attached to the hook to then conveniently lift or hoist the ECR apparatus 200.

Each end flange 106, 108 can be easily and conveniently opened by merely removing the flange fastening devices 214. It may be possible to access the electrode packing frame 202 by opening only the first end flange 106. Furthermore, since both the terminal electrodes 204A are configured in the same orientation, and positioned close to first end flange 106, only the first end flange 106 needs to be removed in order to complete any maintenance. The electrodes 204B and terminal electrodes 204A can be easily accessed for routine maintenance and replacement in situ. Also, if needed, it may be possible to remove a single electrode 204A, 204B without having to remove any other electrode plates.

Figure 4:
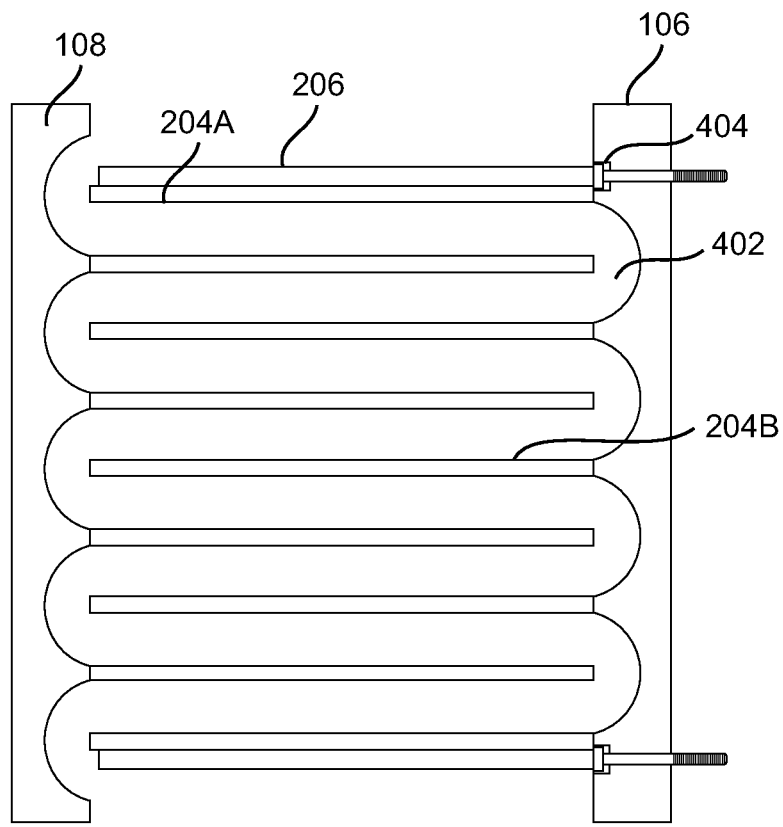
FIG. 4 is a cross-sectional view of the end flanges and electrodes according to an embodiment of the invention.

Referring now to FIG. 4, the terminal conductor bars 206 may be sealed to the end flanges with suitable sealing mechanisms, such as, O-rings 404. The end flanges 106, 108 can further include integral flow diverters 402. The diverters 402 may be cutouts or cutaways configured on the end flanges 106, 108 to provide a laminar process stream flow. The diverters 402 can be configured such that the fluid stream to be treated flows in a serpentine manner between the base of the electrode stack and the top of the electrode stack. A continuous flow of the fluid stream across all electrodes can be provided by ensuring that the electrodes 204A, 204B are arranged in a sequential horizontal arrangement and by ensuring that the cell has only one inlet at the bottom and one outlet at the top of the cell. This arrangement allows unimpeded laminar flow over the entire width of the horizontally arranged electrodes 204A, 204B.

According to another embodiment, a method for treating a fluid stream is disclosed herein. The method involves providing an embodiment of the ECR apparatus as described earlier to facilitate the treatment of the fluid stream. The fluid stream can enter the ECR apparatus on a lower quadrant tangential to the tubular cell and it can exit the cell at a top quadrant tangential to the cell. The ECR apparatus can disinfect various forms of bacteria by electrochemical oxidation and agglomerating the suspended solids from the process stream via coagulation of the suspended particles. More specifically, the ECR apparatus can be used in a pressurized industrial process as opposed to an atmospheric bath or static configuration where additional gas handling or other solids removal equipment is required.

In one aspect, pressurized saline seawater can be combined with the fluid stream to form a process stream. The pressurized stream of seawater provides a known salinity for certain electrochemical reactions to occur and it improves the conductivity of the wastewater stream to reduce cell voltage and power. The ECR apparatus can also operate without the addition of saline seawater at higher operating voltage (power) and without forming chlorine disinfectant compounds. Other oxidants such as hydroxides, peroxides, etc. can be formed in order to provide the required disinfection.

The treatment of the process stream may require the removal of contaminants that add to the biological oxygen demand (BOD) and the chemical oxygen demand (COD). It may also require the removal of solid waste matter along with removal and destruction of harmful bacteria such as fecal coliform. These contaminants are soluble and insoluble. Those that are soluble are chemically treated with strong oxidants such as chlorine, hypochlorite, ozone, and peroxides. This initial treatment step may be done prior to passing the fluid stream through the ECR apparatus. Applicant's Omnipure™ system may be used for this initial treatment step.

The next treatment step can involve the removal of the solid matter from the process stream that further contains these contaminants (BOD, COD, fecal coliform, etc.). The ECR apparatus aids to create an environment that promotes removal of these solids. The solid matter may be fine colloidal particles.

As the process stream traverses through the ECR apparatus, DC is passed between the horizontally arranged stack of electrodes. During the electrolysis process, the anode will electrochemically dissolve/erode while the cathode will be subjected to passivation, not dissolving. The anode/sacrificial electrode continuously produces ions in the water. These released ions are usually metallic hydroxides (and, typically, iron hydroxides). The released ions destabilize the negative charges of the fine suspended colloidal particles and the suspended colloidal solids are easily attracted to the metallic cations. These metallic ions act as a nucleus to attract the electron laden colloidal particles together into a floc precipitate. This generates a larger, heavier floc, which can then be settled via gravity in a collection tank and the treated water is ready for discharge. The treated fluid or supernate is substantially contaminant-free.

A novel aspect of fluid treatment using the ECR apparatus is the formation of optimum-sized agglomerated particles or flocs with the least amount of metal/electrode consumption. This can prolong the life of the consumable electrodes and it can also minimize the use of electrical power. Also, once the floc is formed, the turbulence in the liquid stream is minimized so the agglomerated floc does not break apart and can easily be settled. The formation of optimum-sized flocs can be facilitated by: a) ensuring that the electrodes in the electrode packing frame are arranged in a horizontal plane and are spaced appropriately at a predetermined distance; b) controlling the velocity of the fluid stream, and c) facilitating appropriate changes to the direction of the serpentine wastewater flow by providing flow diverters on end flanges.

Hydrogen gas is a byproduct of the reactions of the electrocoagulation process in the ECR apparatus. The hydrogen generated in the ECR apparatus is lighter than the fluid stream/process stream liquid. The hydrogen moves at a higher velocity due to its density relative to the wastewater stream. Therefore, the added hydrogen acts like a chimney or Venturi effect, and as the wastewater stream flow serpentines through the bottom of the ECR apparatus to the top there is added velocity which can promote cleaning of the electrode plates and also reduce the resistance between the electrode plates and the overall operating voltage.

The flow diverters in the end flanges may allow a continuous process stream to be directed in a serpentine flow inside the cell. The sequential horizontal arrangement of the electrodes, and the cell having one inlet and one outlet, can allow the flow of the continuous stream across all electrode plates. The short-circuiting of the flow can be prevented by the serpentine flow with the sequential and horizontal arrangement of the electrodes. Furthermore, it can prevent the formation of scales or deposits which may not allow an even distribution of the flow across all electrode plates such as that occurs when the plates are oriented in a vertical arrangement as in conventional EC devices. In this conventional arrangement, flow in may equal flow out but it does not guarantee an even and equal flow between each pair of plates. In a worst case scenario, the flow may be restricted or even stopped between one or more pairs of plates in the stack but the operator may not be made aware of this situation. On the other hand, the power supply to the ECR apparatus, as discussed herein, may be controlled by onboard PLC (Programmable logic controller). The process stream and voltage to the ECR apparatus may be continuously monitored. Therefore, if the flow is restricted or stopped between any two electrode plates, the operator can be immediately made aware, using conventional techniques, such as increased voltage, before overheating and possible explosion of the hydrogen in the ECR apparatus.

The treated stream that exits the ECR apparatus can be piped up to a degasification vessel. This allows the venting of hydrogen gas. The degasification step can further enhance the ability of flocculated particles to be gravity separated. The flocculated particles can be separated in a settling tank below the degasification vessel. The settling tank can have a sloped bottom to accumulate the settled solids for removal and for further processing as Class B disinfected solids that can be suitable for discharge at a landfill. At the top of the settling tank, the supernate may have a quality that meets discharge requirements and can be released from the treatment system. For example, the treatment process can provide supernate quality well within MEPC.159(55) and MEPC 227(64) requirements of the International Maritime Organization (IMO) while eliminating the need to handle waste solids from raw, untreated influent.

According to another embodiment, the operation of the ECR apparatus in a high pressure and high velocity mode is facilitated by the tubular design of the cell of the ECR apparatus. According to an embodiment, a novel cleaning procedure for the electrode stack is disclosed. The process involves passing water under high pressure conditions from the inlet at the bottom of the cell. The water is allowed to flow upward through the electrodes in the electrode stack and out through the outlet at the top of the cell. The process further involves scrubbing the electrode stack with air under high pressure conditions. The air is passed from the outlet and allowed to flow downward through the electrodes in the electrode stack and exit out through the inlet. The cleaning procedure is carried out under high pressure conditions—from about 80 psi to about 120 psi—at predetermined time intervals. In one exemplary embodiment, the pressure inside ECR apparatus pressure is maintained at approximately 15 psi and 35 psi during a forward and a backward flush respectively while providing 80 psi of air scrubbing.

The ECR apparatus can withstand cleaning under substantially high pressure conditions in situ, unlike comparable tank-based conventional EC devices, without any leaks and physical deformation of the body of the cell. For instance, the various components, namely, the terminal and intermediate electrodes, the conductor bar, O-ring seals, studs, etc. can withstand the high pressure backflush and can exhibit even wear. Dimensional changes and weight loss of the electrodes may be equal throughout the electrode stack. The electrodes do not exhibit any visible indication of water hammer effects. According to an embodiment, the polarity of the electrodes should be reversed periodically (once at least every 15 minutes) during operation in order to obtain optimum performance and uniform wear of the electrodes.

As a consequence of the sequential high pressure air and water backflush purge between operating cycles, scaling is minimized and the electrodes can operate more efficiently without manual cleaning for extended periods. The operating voltage can be increased proportionally with operating hours and accumulation of scale and operating voltage can be reduced when the scale is removed. According to an embodiment, the cleaning procedure ensures that the electrode plates, at required operating conditions, can be operational for over 1500 operating hours before having to be replaced.

The cleaning may be automated using various control systems known in the art. Such a high pressure cleaning protocol facilitates the continuous generation of highly charged particles and can minimize the manual cleaning of the electrodes. This can also minimize operator maintenance/manual cleaning and can substantially reduce any apparatus downtime. The automated cleaning process can also provide a better and more uniform cleaning operation.

The ECR apparatus is a light-weight modular system that features a small footprint and is easy to install and maintain. The costs involved in the construction of the ECR apparatus are substantially lower than conventional EC devices. This is due to the fact that the ECR apparatus includes standard pre-manufactured components. The assembly of the ECR apparatus requires minimal gluing and fixtures to hold the components. Since minimal gluing is required, the risk of leaks developing is also minimized.

Aside from notable cost savings, the ECR apparatus is safer for operators to perform routine maintenance to relieve the potential for dangerous pinch points, electrode stack shifting, and manual lifting of heavier electrode plates. The ECR apparatus can conveniently allow for front access when changing electrodes. The ECR apparatus can offer protection to operators as there are no exposed electrical connections or electrode plates where human contact can be made.

The one or more embodiments of the ECR apparatus disclosed herein may be used in any system for treating wastewater. For example, the ECR apparatus can be used in the system disclosed in U.S. Pat. No. 8,465,653, the contents of which are incorporated in its entirety herein, in lieu of the electrocoagulation apparatus disclosed therein.

The ECR apparatus can be used in a range of electrocoagulation applications for wastewater treatment and recovery, e.g. frac flowback and produced water treatment, and metals and contaminant removal (e.g. phosphates) from variety of waste streams.

The following description with reference to the accompanying drawings is provided to assist in a comprehensive understanding of exemplary embodiments of the invention as defined by the claims and their equivalents. Accordingly, those of ordinary skill in the art will recognize that various changes and modifications of the embodiments described herein can be made without departing from the spirit and scope of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

While the ECR apparatus and methods are described in terms of "comprising," "containing," or "including" various components and methods also can "consist essentially of" or "consist of" the various components and steps. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used herein, are defined to mean one or more than one of the element that it introduces. If there is any conflict in the usages of a word or term in this specification and one or more patent(s) or other documents that may be incorporated herein by reference, the definitions that are consistent with this specification should be adopted.

It is to be understood that the singular forms "a," "an," and "the" include plural referents unless the context clearly dictates otherwise. As used herein, the words "comprise," "have," "include," and all grammatical variations thereof are each intended to have an open, non-limiting meaning that does not exclude additional elements or steps. It should be understood that, as used herein, "inner," and "outer," "first," and "second," etc., "upper" and "lower" etc., are arbitrarily assigned and are merely intended to differentiate between two or more surfaces, electrodes, covers, etc., as the case may be, and does not indicate any particular orientation or sequence. Furthermore, it is to be understood that the mere use of the term "first" does not require that there be any "second," and the mere use of the term "second" does not require that there be any "third," etc.

Accordingly, the ECR apparatus is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

We claim:

1. An electrocoagulation reactor (ECR) apparatus for treatment of a fluid stream, comprising:
    (A) an electrode packing frame, wherein the electrode packing frame comprises:
        (i) a pair of opposing inserts, wherein a first insert is spaced apart from a second insert by a predetermined distance; and
        (ii) an electrode stack, wherein the electrode stack comprises a plurality of electrode plates, wherein the plurality of electrode plates comprises:
            (A) an upper terminal electrode plate;
            (B) a lower terminal electrode plate; and
            (C) a plurality of intermediate electrode plates sandwiched between the upper and lower terminal electrodes,
            each of the terminal electrode plates is configured to be thinner in comparison to the intermediate electrode plates, and wherein each of the electrode plates is horizontally stacked within a pair of opposing insert openings formed on the pair of opposing inserts;
    (B) a cylindrical cell, wherein the cylindrical cell comprises cylindrical sidewalls, and wherein the electrode packing frame is inserted within the cylindrical cell; and
    (C) a first and a second flange, wherein each of the flanges is configured to seal a first and a second end of the cylindrical cell, wherein each of the first and the second flanges further comprises a plurality of integral flow diverters, and wherein the flow diverters are configured to facilitate a serpentine flow of the fluid stream within the cylindrical cell,
    wherein a conducting bar extends across a length of each of the horizontally stacked upper and lower terminal electrodes.

2. The ECR apparatus according to claim 1, wherein an outer sidewall of each of the inserts is curved, and wherein each of the insert openings is formed on an inner sidewall of the inserts.

3. The ECR apparatus according to claim 2, wherein each of the electrodes is positioned at a predetermined distance from an adjacent electrode.

4. The ECR apparatus according to claim 1, wherein each of the inserts is crescent-shaped.

5. The ECR apparatus according to claim 1, wherein each of the inserts is non-conductive.

6. The ECR apparatus according to claim 1, wherein each of the inserts is configured to be removable and replaceable.

7. The ECR apparatus according to claim 2, wherein the outer sidewall of the inserts comprises one or more insert apertures.

8. The ECR apparatus according to claim 7, wherein the cylindrical sidewalls of the cell further comprise one or more openings, and wherein each insert aperture is aligned with a corresponding opening on the cylindrical sidewalls of the cell to form a throughhole when the electrode stack is inserted within the cell.

9. The ECR apparatus according to claim 8, further comprising a locking device, and wherein the locking device is threaded into the throughhole to securely couple the electrode packing frame to the cell.

10. A method for treating a fluid stream comprising: providing the electrocoagulation reactor (ECR) apparatus of claim 1.

11. The method according to claim 10, further comprising: passing the fluid stream through the ECR apparatus; and combining a pressurized saline seawater stream with the fluid stream prior to passing it through the ECR apparatus.

12. The method according to claim 10, further comprising facilitating an even and equal flow of the process stream between each of the electrode plates, wherein each of the opposing inserts in the ECR apparatus of claim 1 further comprises a plurality of opposing insert openings such that each pair of opposing insert openings is at a predetermined and equal distance from an adjacent pair of opposing insert openings to facilitate the even and equal flow of the process stream between each of the electrode plates.

13. The method according to claim 10, further involving a continuous and serpentine flow of the fluid stream from an inlet at the base of the cylindrical cell to an outlet at the top of the cylindrical cell.

14. The method according to claim 10, further comprising cleaning the electrode stack in-situ between two fluid treatment operating cycles, wherein the cleaning comprises: allowing a pressurized stream of water to flow upward through the electrode stack, wherein the water is passed from an inlet at the base of the cylindrical cell to an outlet at the top of the cylindrical cell; and passing a pressurized stream of air downward through the electrode stack, wherein the air is passed from the outlet at the top of the cylindrical cell.

15. The method according to claim 14, further comprising cleaning the electrode stack at about 80 psi to about 120 psi.

* * * * *